Jan. 1, 1929.
S. J. SAVONIUS
1,697,574
ROTOR ADAPTED TO BE DRIVEN BY WIND OR FLOWING WATER
Filed Aug. 13, 1925       4 Sheets-Sheet 2
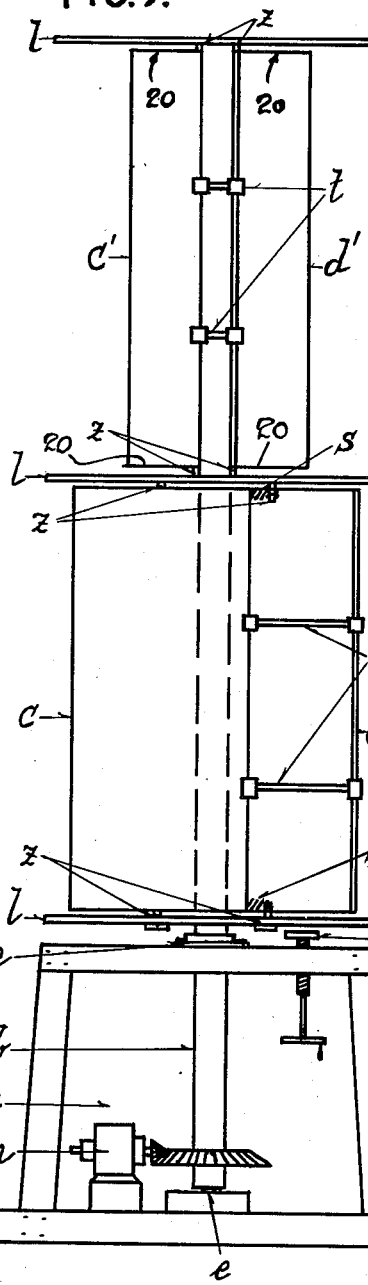
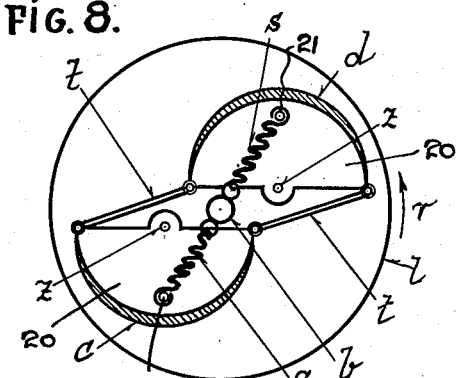
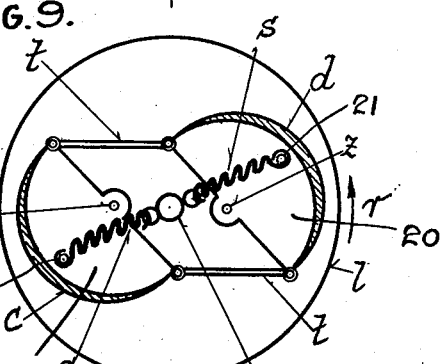
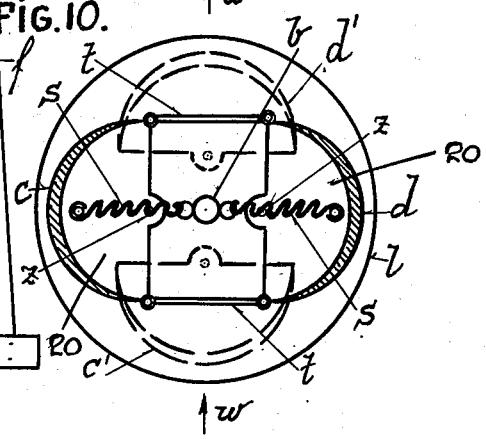
Inventor:
Sigurd Johannes Savonius

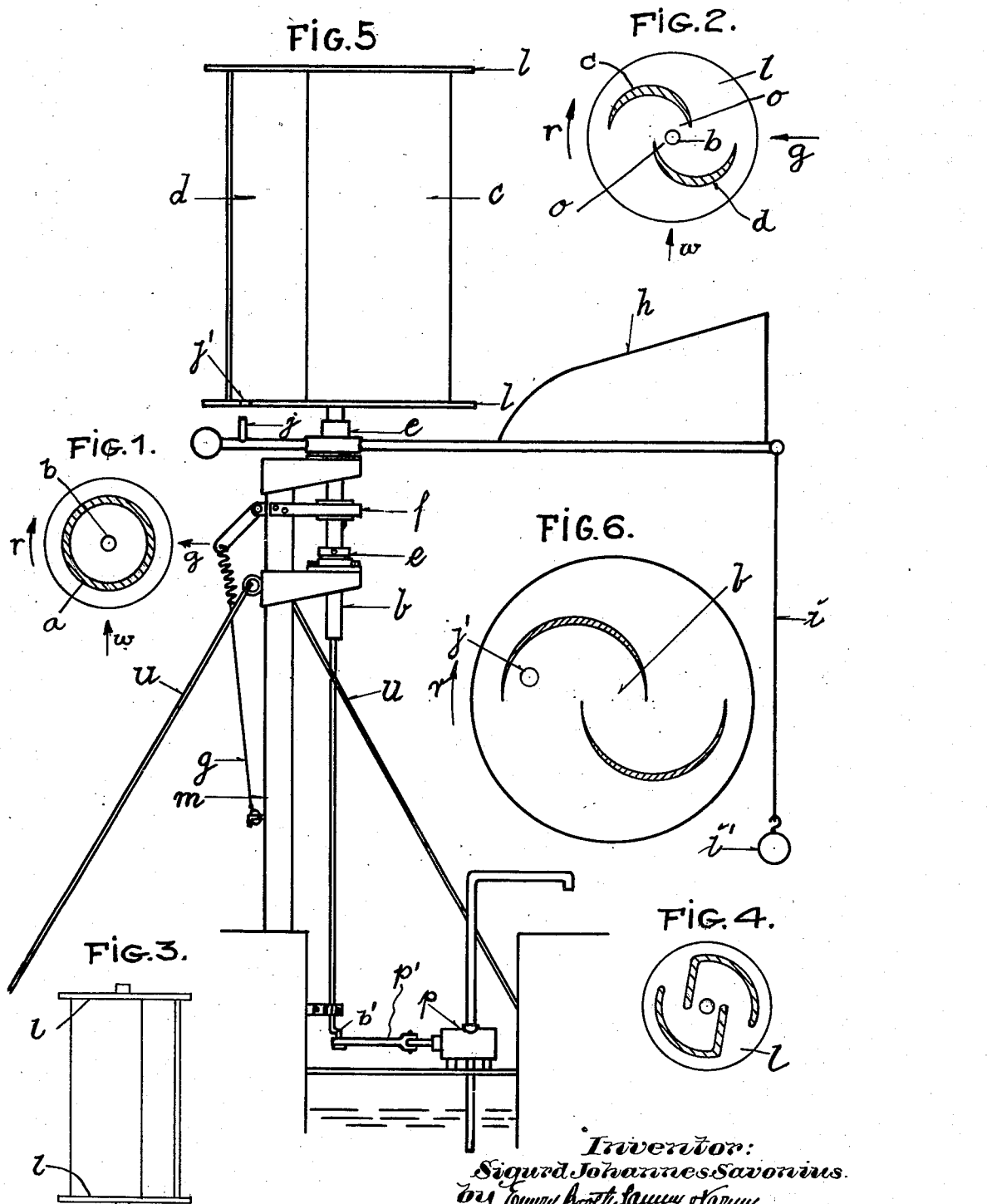

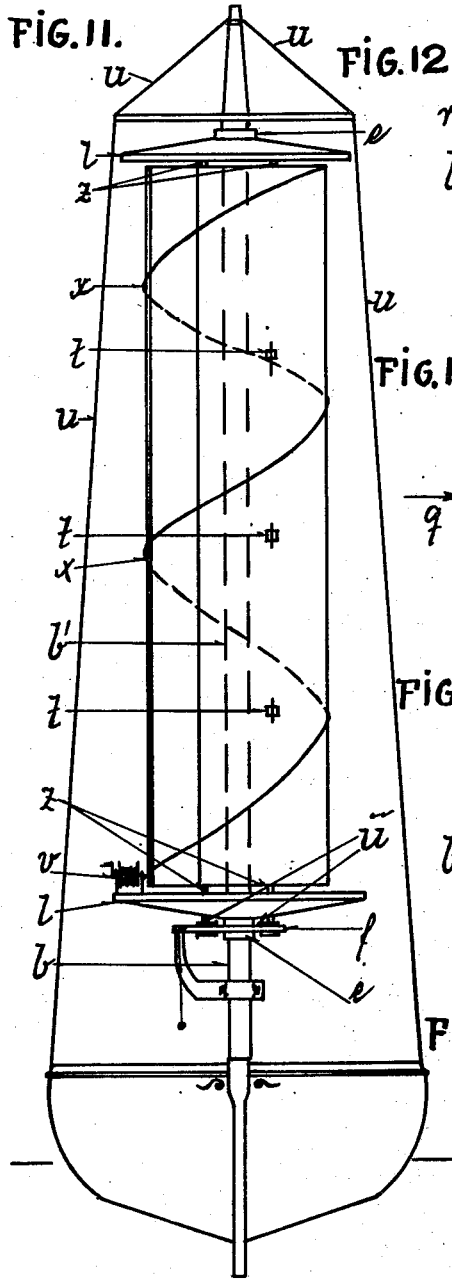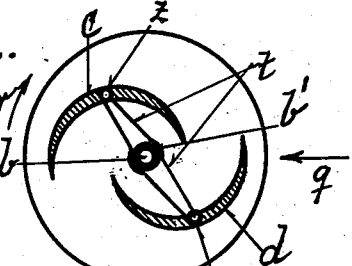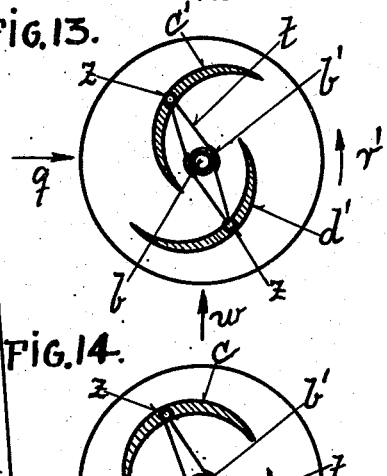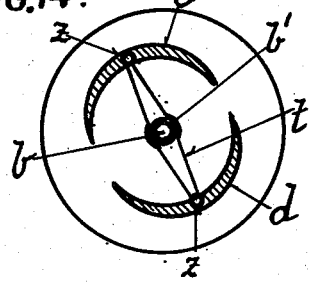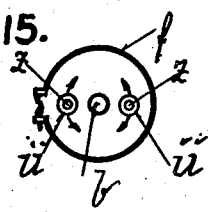

Jan. 1, 1929.　　　　　　　　　　　　　　　1,697,574
S. J. SAVONIUS
ROTOR ADAPTED TO BE DRIVEN BY WIND OR FLOWING WATER
Filed Aug. 13, 1925　　　4 Sheets-Sheet 4

Inventor:
Sigurd Johannes Savonius.
by Emery, Booth, Janney & Varney.
Attys.

Patented Jan. 1, 1929.

1,697,574

UNITED STATES PATENT OFFICE.

SIGURD JOHANNES SAVONIUS, OF HELSINGFORS, FINLAND.

ROTOR ADAPTED TO BE DRIVEN BY WIND OR FLOWING WATER.

Application filed August 13, 1925, Serial No. 49,985, and in Finland December 12, 1924.

My invention relates to improvements in rotors adapted to be driven by wind or flowing water.

The cylindrical rotor and its physical properties have become known through the researches of Professor Gustav Magnus and the subsequent exhaustive experimental researches of the Aerodynamische Versuchsanstalt at Gottingen.

The vane rotor, according to the present invention resembles the cylindrical rotor, in so far as in both cases the same characteristic phenomena and differences in the air pressure appear. The unsymmetrical Magnus flow of air caused by the rotation of my vane rotor is very remarkable and results, similar to the known cylindrical rotor, in a very considerable side pressure or cross drive.

According to my invention, the vane rotor consists of two oppositely arranged hollow shaped vanes of predominantly rectilinear generatrix, the inner edge of each vane catching the segmental space bordered by the other vane, both vanes thus forming an air passage being adapted to force the air current from the hollow side of one of said vanes to the hollow side of the other vane in an S-like passage of substantially constant area. Various embodiments of my invention are diagrammatically illustrated in the accompanying drawings, by way of example.

In the drawings:

Fig. 1 is a horizontal section through a rotor of a known type;

Fig. 2 is a horizontal cross section through a vane rotor according to my invention;

Fig. 3 is an elevation of a modification of my invention;

Fig. 4 is a corresponding horizontal section of a modification of my invention;

Figs. 5 and 6 are, respectively, an elevation and a cross-section through the vane rotor, as applied to the operation of a pump station;

Fig. 7 is an elevation of the improved rotor as applied to a power station;

Figs. 8, 9 and 10, are respectively, horizontal sections through various positions of the rotor vanes;

Fig. 11 is an elevation and partial section through the rotor, as applied to the propulsion of a ship;

Figs. 12, 13 and 14, are horizontal sections through the rotor vanes in various positions;

Fig. 15 is a plan of a detail shown in elevation in Fig. 11; and

Figure 16:
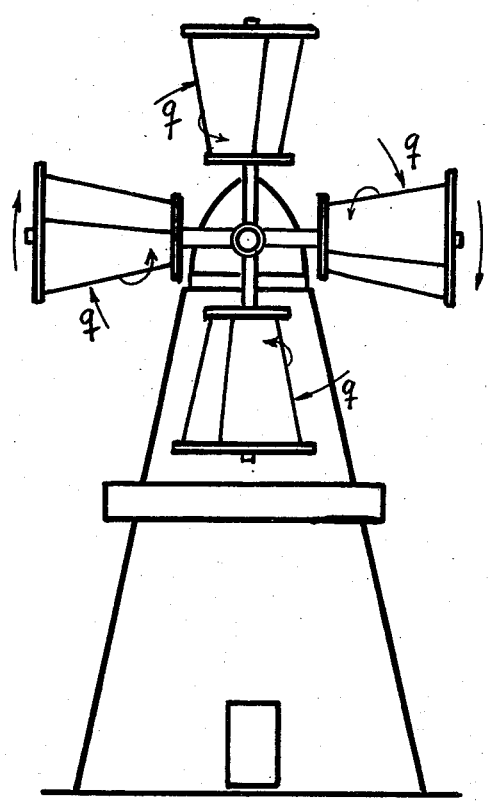
Fig. 16 is an elevation of the improved rotor, as applied to the driving of a windmill.

The known rotor $a$, as illustrated in Fig. 1, rotates around the axle $b$. The direction of the wind is indicated by the arrow $w$, the direction of rotation by the arrow $r$, and the cross-drive, or side pressure, by the arrow $q$.

In the embodiment of my invention shown in Fig. 2, there are two oppositely arranged, hollow-shaped vanes $c$ and $d$, overlapping each other to such an extent that the inner edge $b$ of each vane catches the segmental space bordered by the other vane, both vanes thus forming an air passage, f. i., the area of the central portion being at least one-third of the area of the outer portion. This air passage forces the air current from the hollow side of one of these vanes, for instance, from the hollow side of the vane $d$, to the hollow side of the other vane $c$ in an S-like passage, the area of which is substantially constant. Both vanes are of predominantly rectilinear generatrix, as may be seen from the arrangement shown in Fig. 3.

The effect of this rotor is extraordinarily great. The vane rotor thus designed attains in the free run a circumferential speed which amounts to more than 1½ times the velocity of the wind. The turning power or torque of the vane rotor becomes considerably great and at the same time the side pressure or transverse drive grows by more than double the amount. In addition to this, the torque becomes positive for all positions of the vanes to the wind. The rotor in this form has thus no dead points and starts under load from any position. This fact has been clearly demonstrated by taking torque diagrams in a wind tunnel. In comparison with a sail surface of the size of the projection of the vane rotor, the vane rotor yields a cross drive which is more than double that of the maximum cross-drive of the sail surface. I have compared a cylindrical rotor according to Fig. 1 and a van rotor according to my invention of equal surface area, by exposing them to an equal current of air and setting them into rotation, and have ascertained that the cross-drive for the two rotors increases in equal degree with the increasing speed of rotation.

The considerable capacity and speed of rotation of the vane rotor, according to my invention, may be accounted for in the following manner: When the wind impinges on the inner surface of the vane, it does not lose its entire dynamic power owing to the elasticity of the air, but is projected through the opening $o$ upon the inner side of the vane $d$, and thus prevents the generation of a partial vacuum at this place. As such a partial vacuum has a particularly great detrimental effect, this elimination of the vacuum upon the inner side of the vane moving against the wind is of the highest importance. By the rotation of the vane rotor, an unsymmetrical Magnus flow is produced in the surrounding layers of air, the velocity of the air at the side of the vane rotating in the direction of the wind, becoming up to twice the value, which causes a vacuum at this side of the rotor. As the inner surface and the central portion of the rotor vanes rotate almost in the direction of the wind, the resistance of the over pressure will mainly meet the outer portions of the blade only, and thus act as cross-drive.

In comparison with a modern turbine, a two-vane rotor according to Fig. 2, the maximum projection of which is equal to the circular area of the wind turbine wheel, produces up to 50% more torque than the turbine. The torque of the bi-vane rotor, as shown in Fig. 2, is two to three times as great as the torque of multivane air wheels or earlier constructions. This has been clearly demonstrated by extensive tests in a wind tunnel.

I have experimented with about thirty different shapes of vanes with cylindrical, helical, parabolical, conical, spherical and other shapes of vanes, an example of an efficient form being given in Fig. 4. The experiments have proved that the vanes semi-circular or spiral in cross-section have the greatest speed of rotation and power output.

The properties of the vane rotor may be utilized in various manners. The following constructions, which I have tested in actual practice, must be considered as examples only, as it will be readily understood that many other applications are possible.

In the design according to Fig. 5, the improved rotor is directly applied as wind turbine for driving pumps, dynamos or other machinery. Referring to this figure, $c$, $d$ is the rotor, the vertical shaft $b$ of which is journaled in two bearings $e$, $e$. These bearings are mounted upon the upper end of a pole $m$ adjacent to a well, and supported by rods or stays $u$. The lower end of the shaft $b$ is cranked, and drives during its rotation the pump $p$, by means of a connecting rod $p$. In order to stop the rotor, a spring-controlled brake $f$ is provided, adapted to be actuated by means of a cord or chain $g$. Should the rotor in its arrested state be struck by powerful lateral gusts of wind, the spring-controlled brake gives way a bit to enable the rotor to turn slightly and set itself in the position of minimum wind resistance. Large sizes of vane rotors may be provided with a tail vane $h$, which is adapted to be rendered operative in various manners. In the example illustrated, the tail vane is adapted to swing freely around the upper rotor shaft bearing $e$. After the vane rotor has been stopped by means of the brake $f$, a weight $i'$ is suspended from the chain $i$, so that the opposite end of the rod of the tail vane is raised, and the pin $j$ operatively engages the opening $j'$ in the end-plate of the rotor, and the tail vane is now connected with the rotor. The vanes $c$, $d$ of this modification are rigidly connected with the end plates $l$, the tail vane $h$ thus turning the rotor together with its vanes, in the direction of minimum wind resistance.

In cases where large capacities and constant speeds of rotation come into consideration, a design as illustrated in Fig. 7 may be applied. The rotor is here constructed in two tiers. The two pairs of vanes $c$, $d$ and $c'$, $d'$ are located at right angles to each other. The end-plates $l$, $l$, $l$ are rigidly connected by the shaft $b$ extending through all of them. The individual vanes are provided with plane semi-circular end-plates 20 rigidly connected thereto, and journaled on trunnions fixed upon the plates $l$. The outer edges of the pairs of vanes are connected by means of hinged links $t$. The plates 20 bear pins 21, Fig. 8, springs $s$ being located between the vanes and the shaft $b$, tending to draw the vanes together, and thereby to close the same. A brake $f$ serves for stopping the rotor, whereupon the vanes are drawn into a neutral position and maintained therein. The rotor is mounted on the top of an engine house $k$, in which, for instance, a dynamo-electric machine $n$ is driven by the rotor. The shaft $b$ of the rotor turns in bearings $e$, $e$.

When the rotor is running and the speed exceeds a predetermined value, the centrifugal force acting upon the vanes causes the vanes to turn around the pins $z$, so that the area of engagement of the wind on the inner sides of the vanes becomes smaller. The original position of the vanes is illustrated in Fig. 8. If, now, during the rotation, the centrifugal force acting upon the vanes increases to such an extent that this force exceeds the tension of the springs $s$, the vanes commence to turn upon their pins $z$, Figs. 9 and 10, until the thereby increasing tension of the springs $s$ is equal to the centrifugal force. Now the vanes offer a smaller area of engagement to the wind, and the speed of rotation remains almost unchanged. When the speed of rotation becomes less again, the springs pull the vanes together again, Fig. 8. The links $t$ bring about a uniform movement of the pairs of vanes, and also compensate the action of the centrifugal force; and by straining or relaxing the springs $s$, the speed of rotation and the development of power by the rotor may be regulated as desired. The stopping of the rotor is effected by screwing up the brake $f$, which brings the rotor to a standstill by exerting friction against the bottom plate $l$ of the rotor. After the rotor is stopped, the vanes are drawn into the neutral position, Fig. 10, and fixed therein. Experiments made by me have proved that this regulating device operates entirely satisfactorily, and the rotor runs steadily even in gusty wind, while the speed of rotation remains almost constant.

The advantages of the vane rotor in comparison with the ordinary wind turbine are the following:

Greatest simplicity of construction. A minimum number of parts and bearings, so that the vane rotor costs only a fraction of that of a wind wheel of equal capacity. Towers are not necessary, as the rotors of small capacity such are are used for driving pumps and the like may be mounted on a mast, and for larger capacity, may be designed high and slender. Long life, because a minimum number of moving parts subject to wear are employed. Elimination of long, reciprocating rods and link-work, gear wheels; slide bearings and the like, which cause friction and loss of power. Finally, the possibility to withdraw large amounts of power from the wind, because vane rotors of several hundred square meter area may be constructed simply and cheaply, and yet offer a very good regulation of the speeds of rotation.

In the hitherto described constructions the direct driving power of the vane rotor is employed. It is, however, equally possible also to utilize the cross-drive or side pressure, although the cross-drive in the free run in the wind is not equal to the maximum cross-drive of a motor-driven, cylindrical rotor.

The vane rotor, according to my invention, may, for instance, be utilized to drive a boat or ship. The boat or ship vane rotor as shown by way of example in Fig. 11 consists of two vanes $c$ and $d$. The end-plates $l$ are connected by means of a tube $b'$, and are adapted to turn together with the vanes mounted between them around the steel mast $b$, stayed by rods or wires $u$ in bearings $e$. The vanes are mounted upon trunnions $z$, rotatable in bearings of the end-plates $l$—$l$, Figs. 12 to 14. The lower trunnions $z$, which pass through the lower end-plate, carry on their lower end and rigidly fixed thereon brake rollers $u'$, Figs. 11 and 15. A circular band $f$ extends round the path of motion of said rollers. One end of said band $f$ is fixed to a socket $f^3$, which is mounted upon one of the cross stringers $f^4$ of the boat. For operating the braking band, a chain $f^5$ may be secured to the free end of the band $f$, and led through a suitable opening in the upright shank of said socket $f^3$. As soon as the band is pulled together by the lever or cord, it comes into contact with the rollers $u'$. As these rollers are rigidly connected with the trunnions $z$, they are first revolving with these trunnions around the axis $b'$, without having any rotation around their own axes. But as soon as the friction between the band and the rollers exceeds, the centrifugal force tending to keep the vanes in their original position, the rollers, instead of sliding on the band, are now rolling on it. By this rolling movement, they turn around their own axes and move the vanes with them around these axes, f, i., a reversal of the vanes from their initial position, $c$, $d$, as shown in Fig. 12, firstly to that shown in Fig. 14, and finally to that shown in Fig. 13, thus resulting. If the brake is now released again, the plane rotor resumes its rotation, but in an opposite direction. It is thus possible to sail with the wind from either beam on tack, and do all maneuvers simply by reversing the direction of rotation in the way described. The vanes are connected by the double-armed levers $t$, which are fixed upon the tube $b'$, and which balance the pull on the vanes caused by the centrifugal force.

Right around the two vanes runs a steel wire $x$, which is adapted to be wound up by a reel $v$, so that the vanes may be gradually contracted until they take up a neutral position, as shown in Fig. 14, and the rotor comes to rest. Less winding up of the adjusting wire effects a smaller speed of rotation, on account of the reduction of the free surface of the vanes, and so on, and vice versa, The rotor in this shape may also be employed for utilizing the rotating power.

A vane rotor, as specified above, constructed of plates of wood and with a projection area of 2.5 square meters, has been tested by me on a boat of 5.5 m. length, and 1.8 m. width. The boat attained, in a wind of a velocity of 5 to 6 m. per second, a speed of four knots. The vane rotor has the advantage in comparison with the cylinder rotor that it is not necessary to employ engine power for turning the rotor.

A boat equipped with the vane rotor can sail on all courses to the wind equally well as a boat equipped with ordinary sails, but it has the advantage that the vane rotor is much smaller than a sail with equal driving force. Sailing with the wind from the beam, the vane rotor has a driving effect equal to a sail which is about two and onehalf to three times larger in area than the greatest projective area of the vane rotor.

In the construction according to Fig. 16, the mill is equipped with four vane rotors, instead of the usual sails or sweepers. In comparison with an ordinary four-winged windmill, the vane rotor has an initial torque which is four times as large as in that mill. The speed of rotation is, however, by 60% smaller, so that the output of the rotor mill still exceeds that of the ordinary windmill by a considerable amount.

The application of the vane rotor, instead of the usual sail construction in a windmill or a wind wheel, is to be recommended in all cases where great fluctuations occur is the load, as for instance in driving agricultural machines, pairs of mill-stones, and the like.

It is also possible to employ the vane rotor in the art of flying and in hydro-mechanics.

The vane rotor may furthermore be employed in flowing water with horizontal or vertical shaft, as a water power motor. In flowing water, also, a one-sided Magnus flow is generated around the rotor, the velocity of the water upon the following side increasing, whereby even in slowly flowing water, a circumferential speed is attained which is greater than the speed of the flow of the water.

It will be readily understood that many modifications and changes may be made in the invention, without departing from its spirit or its scope, and without sacrificing any of its advantages.

I claim as my invention:—

1. In a rotor adapted to rotate about a central rotary axis, the combination of two oppositely arranged hollow shaped vanes of generally rectilinear generatrix, the inner edge of each vane extending to the segmental space bordered by the other vane, both vanes forming an air passage adapted to force the air current from the hollow side of one of said vanes to the hollow side of the other vane in an S-like path of substantially constant area.

2. In a rotor adapted to rotate about a central rotary axis, the combination of two oppositely arranged hollow shaped vanes of generally rectilinear generatrix, the inner edge of each vane extending to the segmental space bordered by the other vane, two oppositely arranged end-plates axially covering both ends of the vanes, both said vanes and both said end-plates forming an air passage adapted to force the air current from the hollow side of one of said vanes to the hollow side of the other vane in an S-like path of substantially constant area.

3. In a rotor adapted to rotate about a central rotary axis, the combination of two oppositely arranged hollow shaped vanes of generally rectilinear generatrix, the inner edge of each vane extending to the segmental space bordered by the other vane, two oppositely arranged end-plates axially covering both ends of the vanes, both said vanes and both said end-plates forming an air passage adapted to force the air current from the hollow side of one of said vanes to the hollow side of the other vane in an S-like path of substantially constant area, the ends of said vanes being rotatably mounted on trunnions, parallel links directly connecting the respective inside and outside edges of both vanes, springs connecting both said vanes and adapted to tend to keep said vanes in the position of the maximum effective wind exposure.

4. A rotor comprising two oppositely curved vanes overlapping each other in the center, there being a gap between the inner sides of said vanes, rotary end-plates between which said vanes are located and adapted to turn, trunnions upon the ends of said vanes and extending through said end-plates, and brake rollers on said trunnions adapted to reverse the mutual position of said vanes and to reverse the direction of rotation of said rotor.

5. A rotor comprising two oppositely curved vanes overlapping each other in the center, rotary end-plates between which said vanes are located and adapted to turn, and a flexible cable laid around the said vanes in a helix and adapted to contract said vanes or to allow them to expand.

6. A rotor comprising two oppositely curved vanes overlapping each other in the center, rotary end-plates between which said vanes are located and adapted to turn, trunnions on the ends of said vanes and extending through said end-plates, brake rollers on said trunnions adapted to reverse the mutual positions of said vanes, and a flexible cable laid around said vanes and adapted to contract said vanes or to allow them to expand.

In testimony whereof, I have signed my name to this specification.

SIGURD JOHANNES SAVONIUS.